(12) United States Patent
Kimmelmann et al.

(10) Patent No.: US 6,223,426 B1
(45) Date of Patent: *May 1, 2001

(54) DEVICE FOR INTRODUCING VALVE KEYS IN INTERNAL-COMBUSTION-ENGINE VALVES

(75) Inventors: Walter Kimmelmann, Aachen; Andreas Themann, Hilden; Christian Krump, Erftstadt, all of (DE)

(73) Assignee: ABB Patent GmbH, Mannheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,485

(22) Filed: Dec. 18, 1997

(30) Foreign Application Priority Data

Dec. 18, 1996 (DE) .................................. 196 52 711

(51) Int. Cl.⁷ ...................................................... B23P 19/04
(52) U.S. Cl. ................................................. 29/771; 29/215
(58) Field of Search .............................. 29/888.4, 888.41, 29/888.46, 771, 787, 214, 215, 809, 798, 813

(56) References Cited

U.S. PATENT DOCUMENTS

| 3,793,999 | * | 2/1974 | Seiler et al. | 29/214 |
| 4,494,306 | * | 1/1985 | Immonen | 29/809 |
| 5,072,950 | * | 12/1991 | Littleproud et al. | 29/215 |
| 5,207,196 | * | 5/1993 | Kuonen et al. | 29/214 |
| 5,226,229 | * | 7/1993 | Pierce | 29/215 |
| 5,560,099 | * | 10/1996 | Leistner et al. | 29/798 |

FOREIGN PATENT DOCUMENTS

| 32 47 589 C2 | 1/1992 | (DE) . |
| 7245256 | 11/1997 | (DE) . |

* cited by examiner

*Primary Examiner*—S. Thomas Hughes
*Assistant Examiner*—Jermie E. Cozart

(57) ABSTRACT

Devices for introducing valve keys in internal-combustion-engine valves have heretofore required complex locking and actuating devices in order to bring the valve keys into a fitting position. In order to reduce the introducing procedure, a guide body has a recess which runs symmetrically with respect to its central axis. A conveying channel is formed by a pin passing through the recess in its longitudinal direction, by wall regions of the recess and by guide beads which are attached in such a way that they can pivot and are extended parallel to the pin in their basic position. The guide bead is bent inwards in the direction of the pin with such a radius and a distance between the bent region and the pin as well as the valve stem is set in such a manner, that bulges of the fed-in valve key engage into annular grooves of the valve stem at the end of the conveying channel.

5 Claims, 2 Drawing Sheets

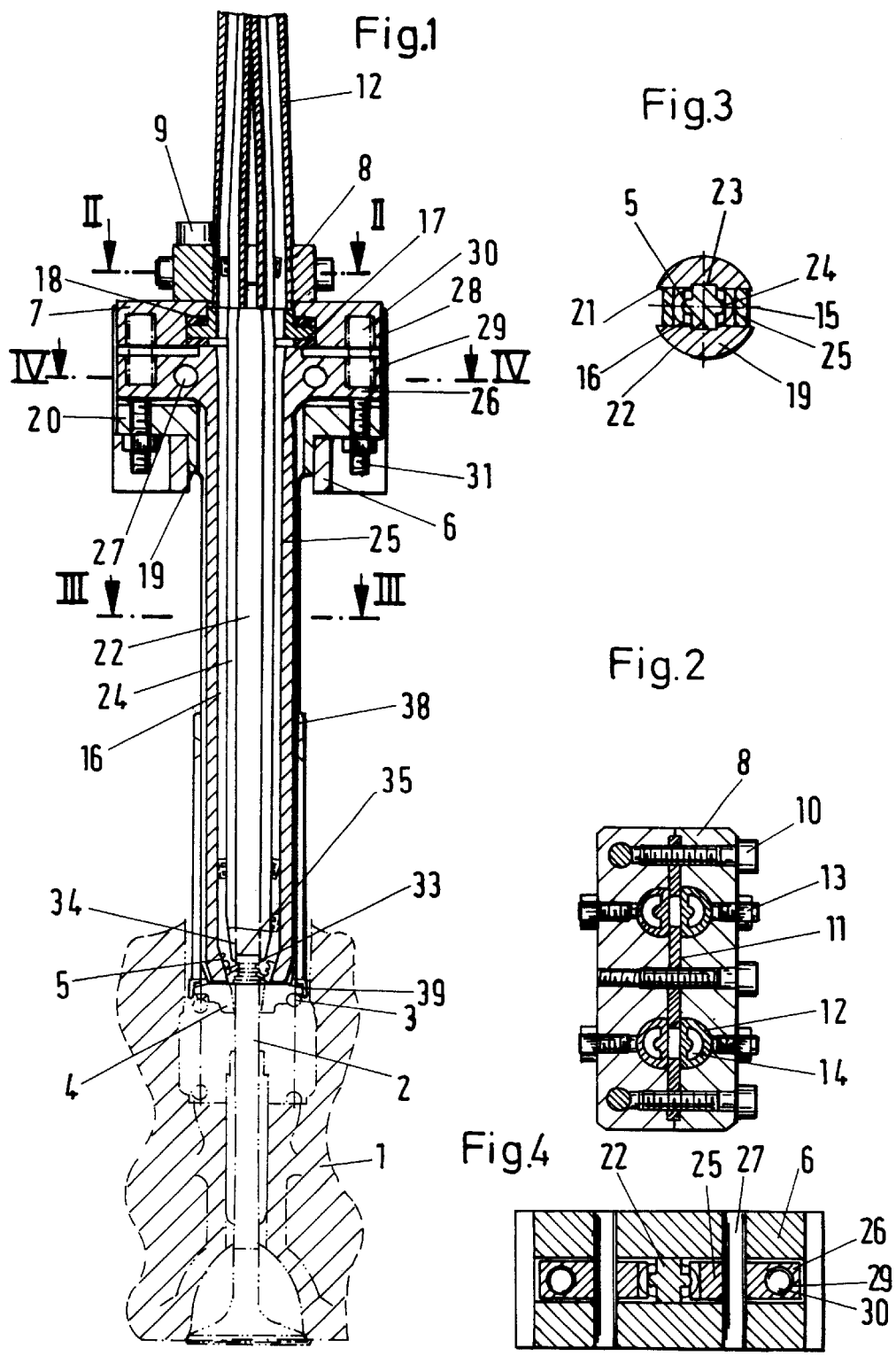

DEVICE FOR INTRODUCING VALVE KEYS IN INTERNAL-COMBUSTION-ENGINE VALVES

BACKGROUND OF THE INVENTION

Field of the Invention

The invention relates to a device for introducing valve keys between a valve disc and a valve stem in internal-combustion-engine valves, including a guide body having a flange secured on a base body and projecting in the direction of the valve stem, a conveying channel assigned to the guide body and intended for feeding the valve keys into a fitting position, two feeders opening into the conveying channel for feeding the valve keys, and a centering piece assigned to the guide piece and engaging over the valve disc.

Such a device is disclosed in German Patent DE 32 47 589 C2. In that case, after the valve key has passed from the feeder into the conveying channel, it is retained by a lock assigned to the conveying channel. A pusher rod, which can be moved within the conveying channel, is placed against the locked valve key. When the pusher rod continues to move downwards, the valve key overcomes the lock and is moved into the fitting position with the aid of the pusher rod. The pusher rod remains in engagement until the valve disc is returned into its unstressed position and the projections of the valve key have penetrated into the valve-stem grooves.

The locking and movement mechanisms, together with the control devices which are necessary, result in a structure of the device which is complex and therefore susceptible to faults.

SUMMARY OF THE INVENTION

It is accordingly an object of the invention to provide a device for introducing valve keys in internal-combustion-engine valves, which overcomes the hereinafore-mentioned disadvantages of the heretofore-known devices of this general type and which simplifies the introduction of the valve keys into an installation position.

With the foregoing and other objects in view there is provided, in accordance with the invention, in an internal-combustion-engine valve having a valve disc, a valve stem and valve keys, a device for introducing the valve keys between the valve disc and the valve stem, comprising a base body; a guide body projecting toward the valve stem and having a flange secured on the base body, a central axis and a recess symmetrical to the central axis, the recess defining wall regions; a pin passing longitudinally through the recess; a conveying channel associated with the guide body for feeding the valve keys into a fitting position; two feeders opening into the conveying channel for feeding the valve keys; a centering piece associated with the guide piece and engaging over the valve disc; and pivotally mounted guide beads having a basic position extended parallel to the pin and a region bent inwards toward the pin with a predeterminable radius; the conveying channel formed by the pin, the wall regions and the guide beads; and the bent region, the pin and the valve stem spaced apart by a distance to be set by changing the basic position of the guide beads.

The radius of the inwardly bent region and the distance are selected in such a manner that bulges of the fed-in valve key engage into annular grooves of the valve stem at the end of the conveying channel.

A simply constructed device is provided by virtue of the valve keys being brought into the fitting position automatically, without additional aids, such as pusher rods. The provision of the valve keys is also made simpler because no magazines having locking and release devices are required. Finally, the cycle times in the installation procedure are reduced due to the reduced control and actuating procedures.

In accordance with another feature of the invention, the pin is embedded in opposite grooves of the recesses, has an upper end side adjoining the feeders and has a lower end region with a base surface reaching as far as an end side of the valve stem.

In accordance with a further feature of the invention, in order to obtain a dimensionally accurate interior guidance of the valve keys, the pin has nose-shaped projections along its opposite longitudinal sides, and the nose-shaped projections are constructed in such a way that they are slightly smaller in cross-section than the smallest hollow extent of a valve key.

In accordance with an added feature of the invention, the guide bead has a side facing the feeder which is constructed as a flattened flange part through which a bearing bolt secured in the base body passes transversely with respect to the longitudinal extent of the guide bead, and a clearance fit is provided between the bearing bolt and its bearing bore, which is assigned to the guide bead, as well as between the guide bead and the recess wall. The clearance fits ensure that the pivotably attached guide beads rotate in a trouble-free manner.

In accordance with an additional feature of the invention, the base body and the flange part are each assigned a pretensioned compression spring in oppositely disposed blind bores, and adjusting screws which act towards the flattened flange part are provided in the flange. As a result, the distance between the pin, as well as the valve stem, and the inwardly bent region of the guide bead, can be set in an advantageous manner.

In accordance with yet another feature of the invention, in order to assist the penetration of the bulges of the valve key into the annular grooves of the valve stem, the guide bead has an intrinsic elasticity which acts in the radial direction.

The device can advantageously be used to install the valve disc, simultaneously with the fitting of the valve keys. Therefore, in accordance with a concomitant feature of the invention, the centering piece serves as a clamping piece for receiving and introducing the valve disc.

Other features which are considered as characteristic for the invention are set forth in the appended claims.

Although the invention is illustrated and described herein as embodied in a device for introducing valve keys in internal-combustion-engine valves, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, longitudinal-sectional view through part of a cylinder head and a device according to the invention;

FIG. 2 is a cross-sectional view taken along a line II—II of FIG. 1, in the direction of the arrows;

FIG. 3 is a cross-sectional view taken along a line III—III of FIG. 1, in the direction of the arrows;

FIG. 4 is a cross-sectional view taken along a line IV—IV of FIG. 1, in the direction of the arrows.

DESCRIPTION OF THE PREFERRED EMBODIMENTS

Figure 5:
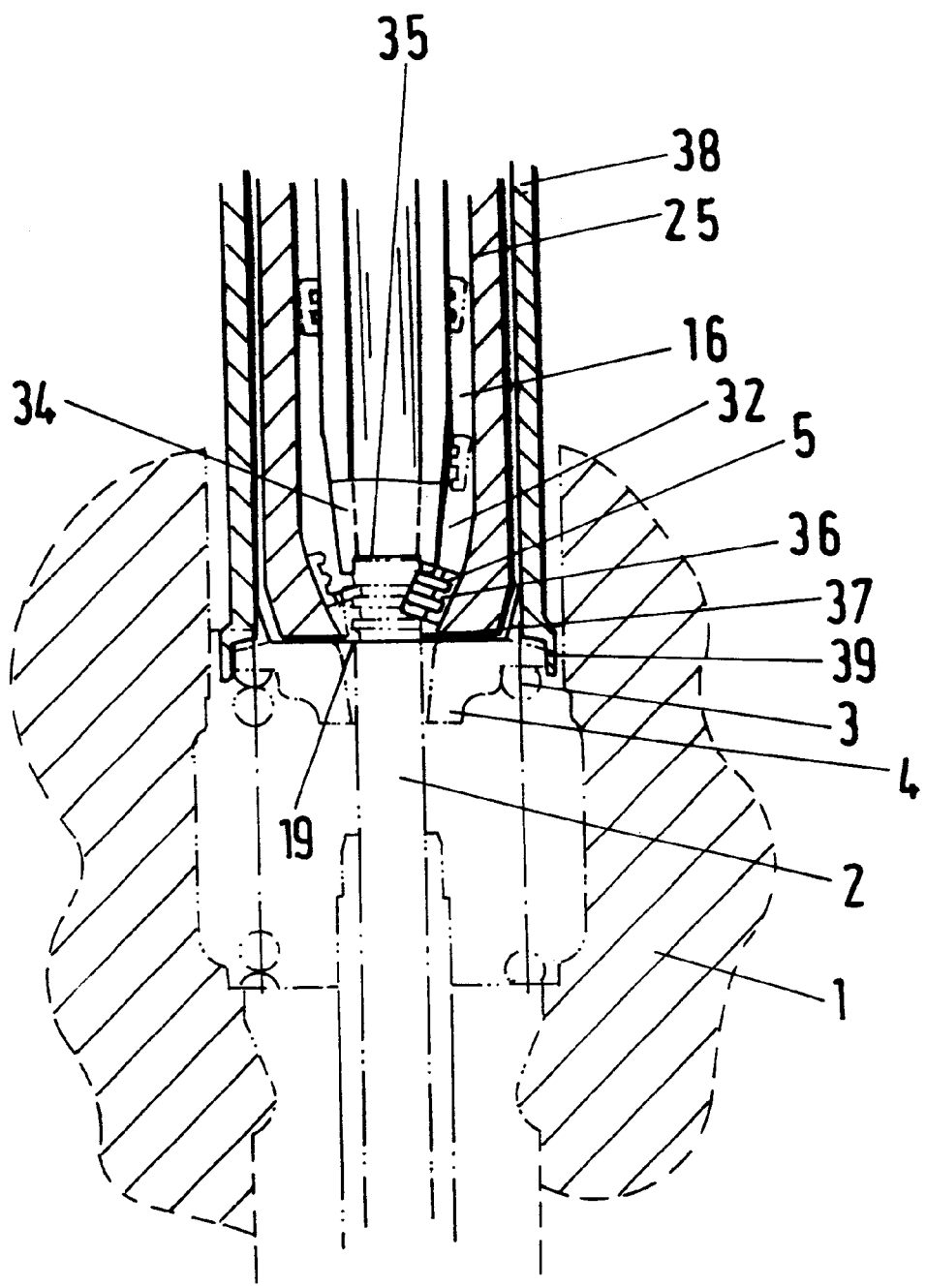
FIG. 5 is an enlarged, fragmentary, longitudinal-sectional view of a lower part of FIG. 1.

Referring now to the figures of the drawings in detail and first, particularly, to FIG. 1 thereof, there is seen a partial region of a cylinder head 1, in which a valve stem 2, a valve spring 3 and a valve disc 4 can b e seen. A device for fitting valve keys is shown in its position of use. The device includes a base body 6 on which a non-illustrated robot gripper or other auxiliary device acts in order to move the device. The base body 6 is assigned a receiving plate 7 which accommodates a holder 8 that is secured on the receiving plate through screws 9. The holder 8 can also be seen in FIG. 2. The holder 8 includes two symmetrical parts, which are held together through the use of screws 10. The parts of the holder 8 have abutting surfaces. Feeders 12, each running in opposite recesses, come to rest against an intermediate layer 11 provided at the abutting surfaces. The feeders 12 are constructed as shaped hoses and are held in their position through the use of adjusting screws 13. A free cross-section 14 of the shaped hoses corresponds to a cross-section of a valve key 5. The valve keys can be easily moved into the shaped hoses by using compressed air. The shaped hoses open directly into a conveying channel 16, which is constructed as a shaped channel, and thus serve as feeders. The feeders 12 are supported in the receiving plate 7 with the insertion of a spacer 17 and sealing elements 18. A guide body 19 is supported and held on the base body 6 through the use of a flange 20. The guide body 19, which is extended in the direction of the valve stem 2 in the manner of a rod, has a recess 21 shown in FIG. 3 which runs symmetrically with respect to its central axis 15 and is extended over the entire length of the guide body. A clear extent of the recess 21 is greater than a maximum external diameter of a valve key 5.

A pin 22, which can also be seen in FIGS. 3, 4 and 5, is embedded in opposite grooves 23 of the recess 21 and has an upper end surface which adjoins the feeders 12. The pin 22 projects in a nose-shaped manner along its opposite longitudinal sides. A nose-shaped projection 24 approximately corresponds to a hollow extent of a valve key 5, with the result that the pin serves as interior guidance for the valve keys. Guide beads 25, which lie opposite one another in the recess 21, are disposed symmetrically with respect to the pin 22. As can also be seen in FIG. 4, the guide beads 25 have ends facing the feeders 12 with a flattened flange part 26 through which a bearing bolt 27 passes transversely with respect to the longitudinal extent of the guide bead 25. The bearing bolt 27 is locked at both ends in the base body 6. A clearance fit between the bearing bolt 27 and its associated bearing bore in the guide bead 25 permits the guide bead to rotate about the bearing bolt. A clearance fit is likewise formed between the recess 21 and the guide bead 25, for the purpose of this rotation. A pretensioned compression spring 30 is disposed in opposite receiving bores 28, 29 of the flange part 26 and the receiving plate 7. A respective adjusting screw 31, which is disposed in the flange 20 of the guide body 19, serves for adjusting the particular guide bead 25 relative to the corresponding bearing bolt 27.

As FIG. 5 shows, there is a distance between the valve disc 4 and the guide beads 25, and rotation can thus take place without hindrance. A lower end 32 of the guide bead 25 is bent inwards into a bent region, with a predeterminable bending radius being maintained. A lower end region 34 of the pin 22 has a recess 33 with a base surface 35 at an end surface of the pin 22 which comes to rest against the valve stem 2. An edge of the recess 33 engages over the valve stem 2 by a predeterminable extent. The guide bead has an internal curvature matched to the external curvature of the valve key in the region of the bending radius. Due to the adjustment capability of the guide beads 25, a distance between the inwardly bent lower end 32 of the particular guide bead 25 and the external periphery of the valve stem 2, or the lower conically extending end region of the pin 22, can be set in such a manner that the valve keys 5, sliding down the shaped channel 16, engage with bulges 36 thereof into annular grooves 37 in the valve stem 2 without additional aids. A sleeve 38 which surrounds the lower partial region of the guide body 19 and is secured there engages over the valve disc 4 and serves as a centering or clamping piece. FIGS. 2 and 5 show a plurality of valve keys in order to clarify their unimpeded downward slide. In actual fact, only two valve keys are fed in per valve stem 2.

The functioning of the device is explained below by using two examples.

According to the first example, the valve stem 2, the valve spring 3 and the valve disc 4 are already fitted in the cylinder head 1. A non-illustrated auxiliary device, such as, for example, a robot, moves the device downwards until an internal peripheral surface 39 of the centering piece 38 engages in a centering manner over the valve disc 4. The guide body 19, which is then seated on the valve disc 4 (see FIG. 5), compresses the valve spring 3 when the downward movement is continued. The downward movement of the device is ended when the base surface 35 of the recess 33 in the pin 22 comes to rest on the end surface of the valve stem 2. This position is achieved in a targeted manner with the aid of a non-illustrated stop. As can be seen in FIG. 5, which is drawn on an enlarged scale, in the installation position which has then been reached, the annular grooves 37 of the valve stem 2 are freely accessible for the bulges 36 of the valve key 5. A valve key 5 is fed in each feeder 12 to the shaped channel 16, through the admission of compressed air. The bulges 36 of the valve keys 5, which then slide down the shaped channel 16 in pairs, automatically slip into the annular grooves 37 of the valve stem 2, at the lower end of the shaped channel, without additional auxiliary tools. An intrinsic elasticity of the guide bead which is formed, for example, of spring steel, acts in the direction of the valve stem and therefore assists the penetration of the bulges into the annular grooves. When the device is moved upwards, the valve disc, which is pressed by the valve spring, slides over the valve keys 5. The device may be used both for perpendicularly positioned valves as well as for valves which are positioned at an angle with respect to the perpendicular. It may operate individually or a differing number of them may operate in parallel simultaneously. The functioning of the independent insertion of the valve keys is dependent, in particular, on the settable position of the inwardly bent end region of the guide bead 25. The size of the bending radius and the elasticity of the guide bead are also of importance, since they both assist the required transverse and tilting movement of the valve key.

According to the second example only the valve stem 2 and the valve spring 3 are already installed in the cylinder head 1. The clamping piece 38 engages over the valve disc 4 and deploys a clamping action. The valve disc 4, which is still mounted outside the cylinder head, is brought together with the device into the position shown in FIG. 5. In order to obtain the clamping action, the internal peripheral surface 39 of the clamping piece 38 is constructed in such a way that it diverges conically outwards at a low-sloping cone angle (about 0.5° C.) After the installation of the valve-key pair according to the first example, the device is moved upwards. Once the valve disc 4 has reached its end position relative to the valve keys during this upwards movement, the clamping action by the clamping piece 38 on the valve disc is released.

We claim:

1. In an internal-combustion-engine valve having a valve disc, a valve stem and valve keys, a device for introducing the valve keys between the valve disc and the valve stem, comprising:

a base body;

a guide body projecting toward the valve stem and having a flange secured on said base body, a central axis and a recess symmetrical to said central axis, said recess defining wall regions;

a pin passing longitudinally through said recess;

a conveying channel associated with said guide body for feeding the valve keys into a fitting position;

two feeders opening into said conveying channel for feeding the valve keys automatically into said fitting position without additional positioning aids or magazines;

a centering piece associated with said guide body and engaging over the valve disc;

pivotally mounted guide beads having a basic position parallel to said pin and a region bent inwards toward said pin with a predeterminable radius, said guide beads having a longitudinal extent and a side facing said feeders with a flattened flange part, a bearing bolt secured in said base body and passing through a bearing bore in said flattened flange part transversely relative to the longitudinal extent of said guide beads, said bearing bolt and said bearing bore defining a clearance fit therebetween, and said guide bead and said recess wall regions defining a clearance fit therebetween;

pretensioned compression springs disposed in opposite blind bores, said compression springs each associated with a respective one of said base body and said flange part, and adjusting screws disposed in said flange of said guide body and acting towards said flange part;

said conveying channel formed by said pin, said wall regions and said guide beads; and said bent region, said pin and the valve stem spaced apart by a distance to be set by changing said basic position of said guide beads.

2. The device according to claim 1, wherein the valve stem has an end surface, said recess has opposite grooves, and said pin is embedded in said opposite grooves, has an upper end surface adjoining said feeders, and has a lower end region with a base surface reaching as far as the end surface of the valve stem.

3. The device according to claim 1, wherein a valve key has a given hollow extent, said pin has opposite longitudinal sides and nose-shaped projections along said opposite longitudinal sides, and said nose-shaped projections have a cross-section slightly smaller than said given hollow extent.

4. The device according to claim 1, wherein said guide beads have an intrinsic elasticity acting in a radial direction.

5. The device according to claim 1, wherein said centering piece serves as a clamping piece for receiving and engaging the valve disc.

* * * * *